US007580144B2

(12) United States Patent
Wadley

(10) Patent No.: US 7,580,144 B2
(45) Date of Patent: Aug. 25, 2009

(54) SYSTEM AND METHOD FOR DETECTING POTENTIAL COUNTERFEITING OF PRINT CARTRIDGES

(75) Inventor: Don Wadley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1188 days.

(21) Appl. No.: 10/807,026

(22) Filed: Mar. 22, 2004

(65) Prior Publication Data

US 2005/0206694 A1 Sep. 22, 2005

(51) Int. Cl.
*G06F 15/00* (2006.01)

(52) U.S. Cl. .................... 358/1.15; 358/1.16; 358/1.17; 399/3; 399/12; 399/24; 399/25

(58) Field of Classification Search ....... 358/1.15–1.18; 399/8, 12, 24, 25
See application file for complete search history.

(56) References Cited

U.S. PATENT DOCUMENTS 5,629,981 A 5/1997 Nerlikar
5,946,520 A 8/1999 Hooper et al.
6,029,238 A * 2/2000 Furukawa ...................... 712/1
6,386,694 B2 5/2002 Kawakami
6,474,771 B2 11/2002 Kim
6,512,894 B2 * 1/2003 Takemoto et al. ............. 399/12
6,546,212 B1 * 4/2003 Ogata et al. ................... 399/24
6,625,402 B2 * 9/2003 Takemoto ...................... 399/8
7,280,772 B2 * 10/2007 Adkins et al. ................. 399/12
7,431,415 B2 * 10/2008 Hetzer et al. .................. 347/17
2002/0063762 A1 * 5/2002 Haan et al. .................... 347/88
2002/0077979 A1 * 6/2002 Nagata ........................ 705/40
2002/0188860 A1 * 12/2002 Parry et al. ................. 713/200
2002/0188883 A1 * 12/2002 Hanna ........................ 713/500
2003/0059050 A1 3/2003 Hohberger et al.
2003/0169149 A1 9/2003 Ohki et al.

FOREIGN PATENT DOCUMENTS

JP 2002006612 11/2002

* cited by examiner

*Primary Examiner*—Chan S Park

(57) ABSTRACT

A method for detecting potential counterfeiting of print cartridges includes transmitting a message regarding date information stored on a print cartridge installed in a printing device, the message being transmitted to a monitoring server.

33 Claims, 7 Drawing Sheets

SYSTEM AND METHOD FOR DETECTING POTENTIAL COUNTERFEITING OF PRINT CARTRIDGES

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Frequently, it is desirable to generate a hardcopy of a document or data set that is produced or stored on a personal computer. Consequently, a wide variety of printing devices have been developed that can receive a print job from a host computer and produce a hardcopy of the document represented by that print job.

In order to produce hardcopy documents, a printing device uses supplies or materials that are consumed as documents are printed. Such consumables include, for example, toner and print media. Toner is typically provided in a print cartridge that can be replaced in the printing device when the toner in the cartridge is expended. The manufacturer of a printing device also typically makes and sells print cartridges that are particularly configured for use in the printing devices of that manufacturer. The print cartridges of the original manufacturer may be particularly suited for use in the printing devices of that manufacturer in a number of ways including, size, electronic connections, toner formulation and quality, etc.

Problems can arise when the print cartridges of another manufacturer are used in a printing device for which they are not specifically designed. These problems can include damage to the printing device and degraded or poor print quality.

These problems are made even worse in the case of counterfeit print cartridges that purport to be from the original manufacturer of the printing device or some other reputable manufacturer, but are not. In such as case, the operator of the printing device may think that appropriate print cartridges have been obtained for the printing device. Then, if problems occur such as damage to the printing device or poor print quality, the reputation of the printing device manufacturer can be severely degraded because the problems are attributed to the equipment of that manufacturer when, in fact, a counterfeit print cartridge is to blame. Additionally, the printing device manufacturer may have to incur significant costs under the warranty of the printing device that would have been avoided if authentic print cartridges had been used. Consequently, it is important to printing device manufacturers to be able to detect the introduction of counterfeit print cartridges into the marketplace.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As used herein and in the appended claims, the term "printing device" means any device that produces a hardcopy from electronic data, including, but not limited to, laser printers, inkjet printers, dot matrix printers, plotters, facsimile machines, digital copiers, photocopiers, multi-function peripherals, and the like. A printing device may produce images on a variety of print media that are in color or are monochromatic.

As used herein, "toner" shall be broadly defined to include any material that is selectively distributed by a printing device on a print medium to form an image. Thus, "toner" includes, but is not limited to, ink, toner, colorant, printing fluid, etc. As used herein and in the appended claims, the term "print cartridge" shall be understood to refer to a cartridge containing a supply of toner that is expended during the operation of a printing device and is replaceable when emptied.

Figure 1:
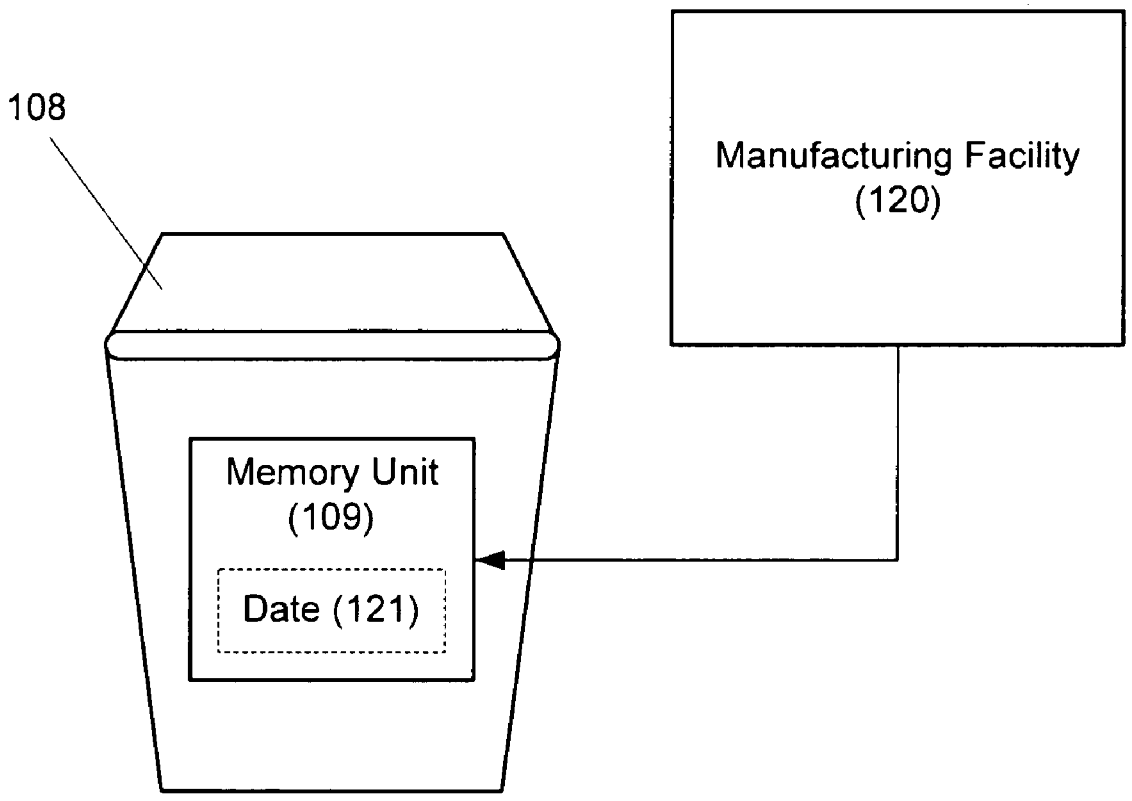
FIG. 1 is an illustration of a print cartridge manufacturing facility according to one embodiment described herein.

FIG. 1 is an illustration of a print cartridge manufacturing facility according to one embodiment described herein. Each print cartridge (108) is manufactured to include a supply of toner. For an inkjet printing device, the print cartridge may also include a print head with nozzles for selectively ejecting toner droplets to form a desired image. The print cartridge may also include an electronic connector for interfacing the cartridge with the electronics of a printing device.

As shown in FIG. 1, the print cartridge (108) also includes an electronic memory unit (109) that is attached or affixed to the print cartridge (108). When the cartridge (108) is manufactured, the manufacturing facility (120) records a date (121) in the memory unit (109) of the cartridge (108). This date (121) may be referred to as a "date of manufacture" or a "date placed in service" for the cartridge (108). The date (121) is used, as described herein, to determine whether the cartridge (108) should have exceeded its useful life.

Figure 2:
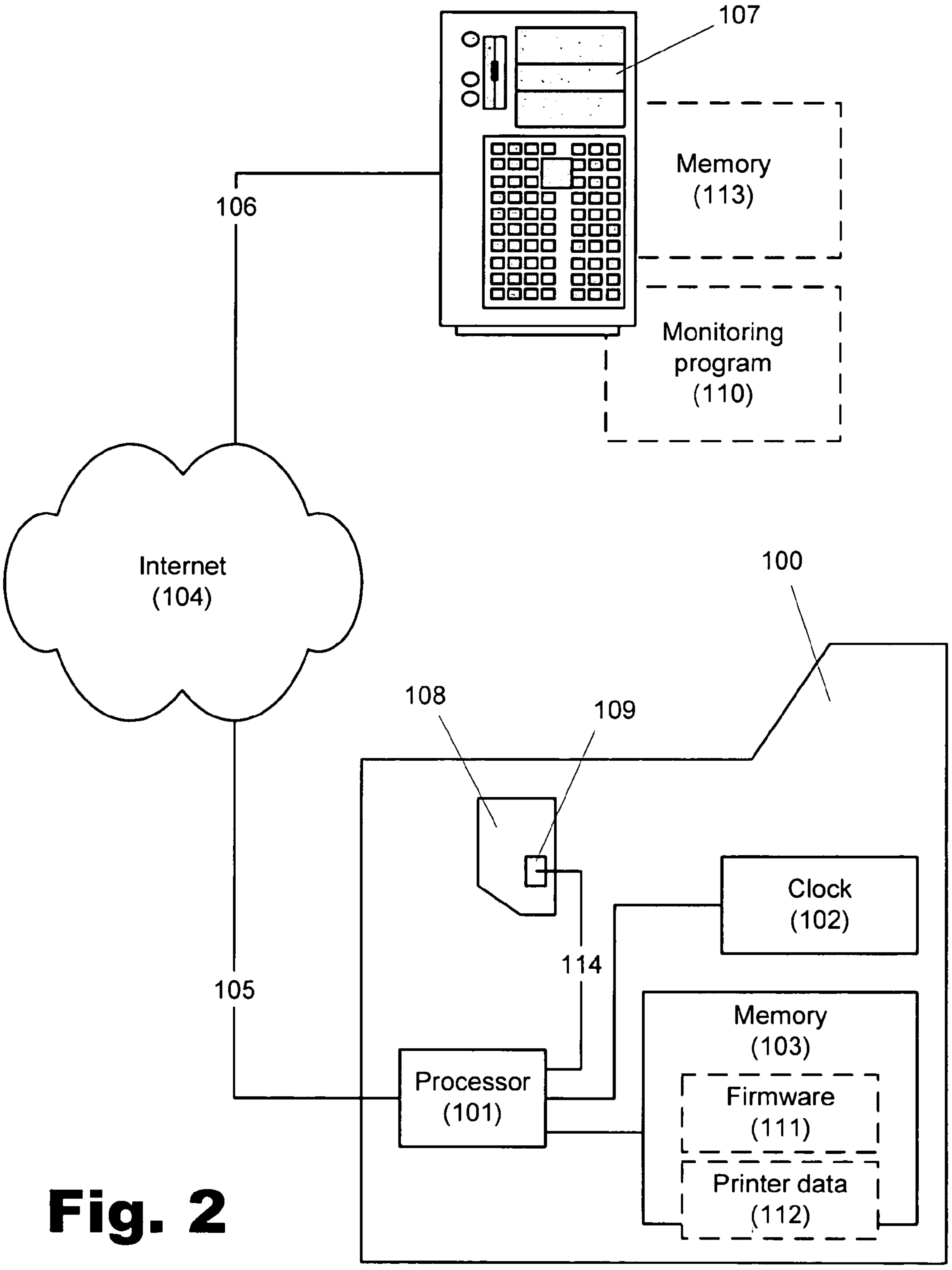
FIG. 2 is an illustration of a system for detecting counterfeit print cartridges according to one embodiment described herein.

FIG. 2 is an illustration of a system for detecting counterfeit print cartridges according to one embodiment described herein. As shown in FIG. 2, after manufacture, the print cartridge (108) is eventually installed in a printing device (100). The printing device (100) consumes the toner in the cartridge (108) as documents are printed.

When the cartridge (108) is installed in the printing device (100), the electronics on the cartridge (108), including the memory unit (109), are interfaced with the electronics of the printing device (100). The electronics of the printing device (100) include a processor (101), a clock (102) and a memory (103).

The memory (103) contains processor-readable instructions, or firmware (111), that are executed by the processor (101) to run the printing device (100). The firmware (111), when executed, causes the processor (101) to access the memory unit (109) on the print cartridge (108) using a connection (114) and read the date (121, FIG. 1) stored in the memory unit (109) of the print cartridge (108).

The processor (101) may also read a "current" date from the clock (102) of the printing device (100). The clock (102) may be incorporated in the processor (101) or may be a separate circuit. The processor (101) then compares the current date from the clock (102) with the date of manufacture (121, FIG. 1) from the memory unit (109) on the print cartridge (108).

Each print cartridge (108) can be operated for an expected useful life. That is, for each cartridge manufactured there is an average amount of time required for that cartridge to be marketed, sold, installed by a user and expended through operation of the user's printing device. The actual useful life of a particular cartridge is affected by many factors, for example, time in storage prior to marketing, location marketed, whether purchased by a commercial enterprise or for use in a private home, etc. As described herein, the "expected useful life" of a print cartridge may be based on the average useful life of such cartridges plus some additional time to account for variations in, for example, the sale date and frequency of use of the individual cartridge.

The expected useful life for cartridges appropriate to the printing device (100) may be stored in the firmware (111). Consequently, if the difference between the date (121, FIG. 1) stored in the memory unit (109) of the cartridge and the current date as reported by the printing device clock (102) exceeds the expected useful life or some other threshold, the printing device (100) may regard the print cartridge (108) as "suspect."

When a suspect print cartridge (108) is identified, the processor (101) of the printing device (100) may send a message indicating that a suspect print cartridge (108) has been installed. This message may be transmitted over any communication line to which the printing device (100) is connected. In the example illustrated in FIG. 2, the printing device (100) has a connection (105) to the Internet (104). Consequently, the message regarding the suspect print cartridge (108) is sent over the connection (105) and the Internet (104) to a monitoring server (107) that is also connected (106) to the Internet.

As an alternative, the printing device (100) may not have a value or threshold that triggers the sending of the message. Rather, the printing device (100) may send a message about the print cartridge (108) every time the printing device (100) is powered up or every time a new print cartridge (108) is installed. Such a message may simply indicate the difference between the date (121, FIG. 1) stored in the memory unit (109) of the cartridge and the current date as reported by the printing device clock (102). Alternatively, the message may simply include the date of manufacture from the print cartridge, leaving the monitoring server to compare that date against a current date.

In any case, the message may also include information about the printing device (100). This information or printer data (112) may be stored in the memory (103) of the printing device (100) and include, for example, the physical location of the printing device, the status of the printing device, the model and other identification of the printing device, toner usage patterns for the printing device, print cartridge history, etc.

These messages and the data they contain from a population of printing devices (e.g., 100) are stored in the memory (113) of the monitoring server (107). The monitoring server (107) runs a monitoring program (110) that analyzes the data in the memory (113) for patterns indicative of the introduction of counterfeit print cartridges.

Figure 3:
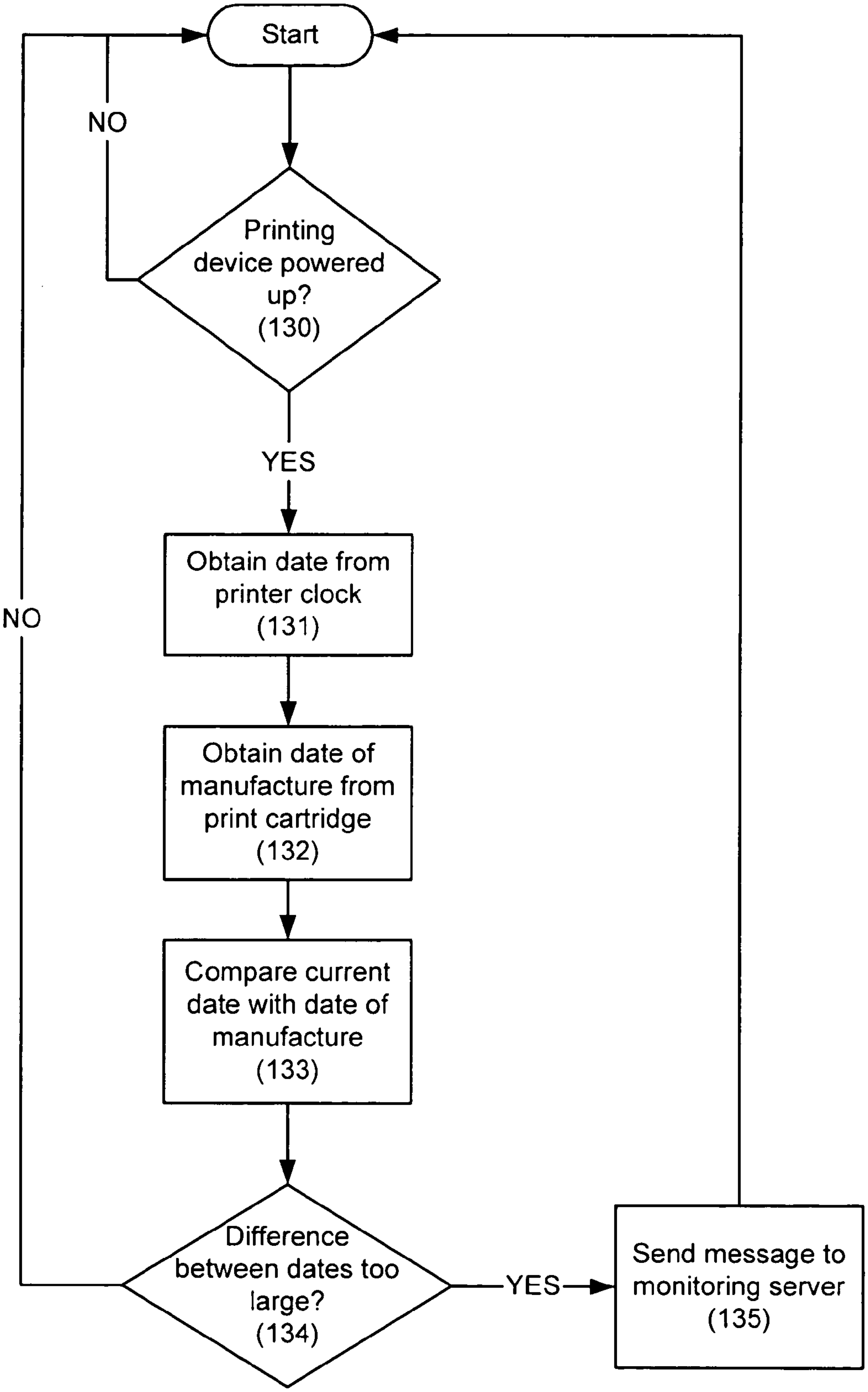
FIG. 3 is a flowchart illustrating a method performed by a printing device to assist in detecting counterfeit print cartridges according to one embodiment described herein.

FIG. 3 is a flowchart illustrating a method performed by a printing device to assist in detecting counterfeit print cartridges according to one embodiment described herein. FIGS. 3-6 may also be considered as diagrams of other embodiments of the firmware (111, FIG. 2) stored in the memory (103, FIG. 2) of a printing device (100, FIG. 2). As shown in FIG. 3, the method may begin each time a printing device is powered up (determination 130).

When the printing device is powered up (determination 130), the processor (101, FIG. 2) executes the firmware (111, FIG. 2) stored in the memory (103, FIG. 2) of the printing device (100). As described above, this programming may cause the processor to read or obtain the current date from a printer clock (102, FIG. 2) (step 131). Next, the processor reads or obtains the date of manufacture stored in the memory unit (109, FIG. 2) of the print cartridge (108, FIG. 2) (step 132). The processor then compares the current date against the date of manufacture taken from the print cartridge (step 133). The difference between the two dates indicates the apparent age of the cartridge, i.e., whether the cartridge should have exceeded is expected useful life.

This is important because a counterfeiter may copy the data in the memory unit of an authentic print cartridge to provide data for the memory unit of a counterfeit cartridge. If this copied data is used for an extended, period of time, the copied manufacture date of the original, authentic cartridge can be expected to move further and further into the past. Consequently, the counterfeit cartridges begin to bear a date of manufacture that indicates that the cartridge, even though newly made, should have already exceeded its expected useful life. If a number of cartridges begin to show up contemporaneously or in a particular geographic area, for example, and are too old to still have useful life based on the on-board date of manufacture, this may indicate the activity of a counterfeiter.

Alternatively, this pattern could indicate simply that a quantity of authentic cartridges was stored for a relatively lengthy period of time, for some reason, before being sold and used. In any event, the unusual activity can be investigated to determine whether a counterfeiter is at work or there is some legitimate reason for the surge in "old" print cartridges.

In order to monitor such patterns of potential counterfeiting, the printing device which has compared the date of manufacture of the print cartridge with the current date may determine whether the difference between the two dates exceeds a predetermined threshold (determination 134). As described above, this threshold may be based on the average expected useful life of the print cartridges for that printing device, perhaps adjusted by some additional amount to account for variations in marketing and consumption patterns. This predetermined threshold may be part of the firmware (111, FIG. 2) stored in the printing device (100).

If the difference between the date of manufacture of the print cartridge and the current date exceeds the predetermined threshold, a message is sent to the monitoring server (step 135). As described above, the monitoring server (107, FIG. 2) may be on the same network as the printing device or may be connected to the printing device via the Internet. Any connection, wired or wireless, between the printing device and the monitoring server may be used.

The message sent to the monitoring server includes, at least, the date of manufacture taken from the installed print cartridge. In some embodiments, the message also includes some indication of the difference between the date of manufacture stored in the memory unit of the cartridge and the current date as reported by the printing device clock. The message may also include printer data about the printing device. As described above, this printer data (112, FIG. 2) may be stored in the memory of the printing device and include, for example, the physical location of the printing device, the status of the printing device, the model and other identification of the printing device, toner usage patterns for the printing device, print cartridge history, etc. This information, particularly, the physical or geographic location of the printing device where the suspect cartridge has been installed may be very useful in determining patterns of counterfeiting or the introduction of counterfeit cartridges in the marketplace.

Figure 4:
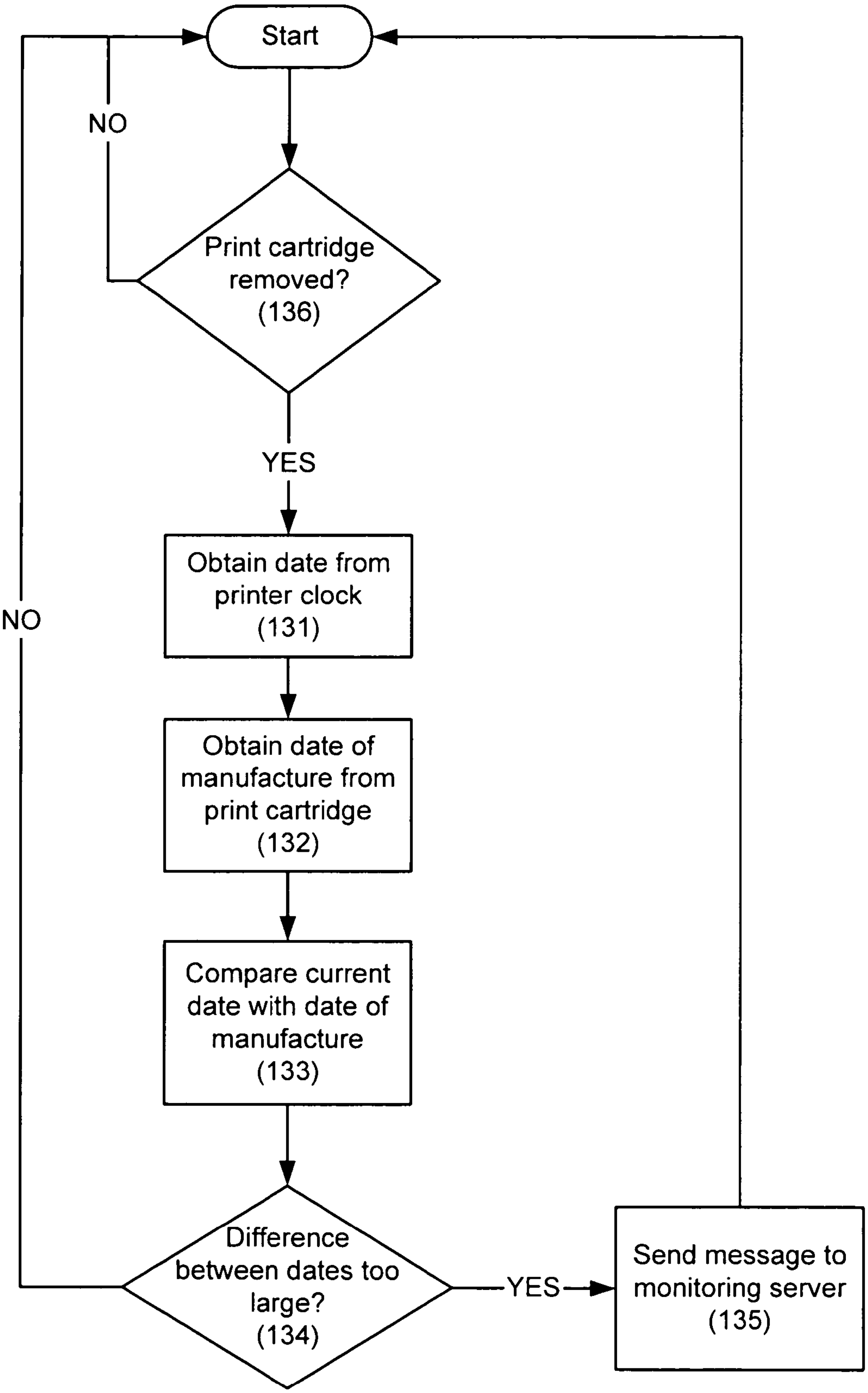
FIG. 4 is a flowchart illustrating an alternative method performed by a printing device to assist in detecting counterfeit print cartridges according to one embodiment described herein.

FIG. 4 is a flowchart illustrating a second method performed by a printing device to assist in detecting counterfeit print cartridges according to one embodiment described herein. The method of FIG. 4 is similar to the method of FIG. 3. However, in the method of FIG. 4, the printing device does not necessarily compare the date of manufacture of the print cartridge with the current date every time the printing device is turned on. Rather, the printing device determines (at step 136) when a current print cartridge is removed and a new (or possibly the same) print cartridge is installed.

At this point, the printing device obtains the date of manufacture from the print cartridge (step 132) and the current date from the printer clock (step 131) and proceed with the comparison (step 133) and subsequent actions as described above with reference to FIG. 3.

Figure 5:
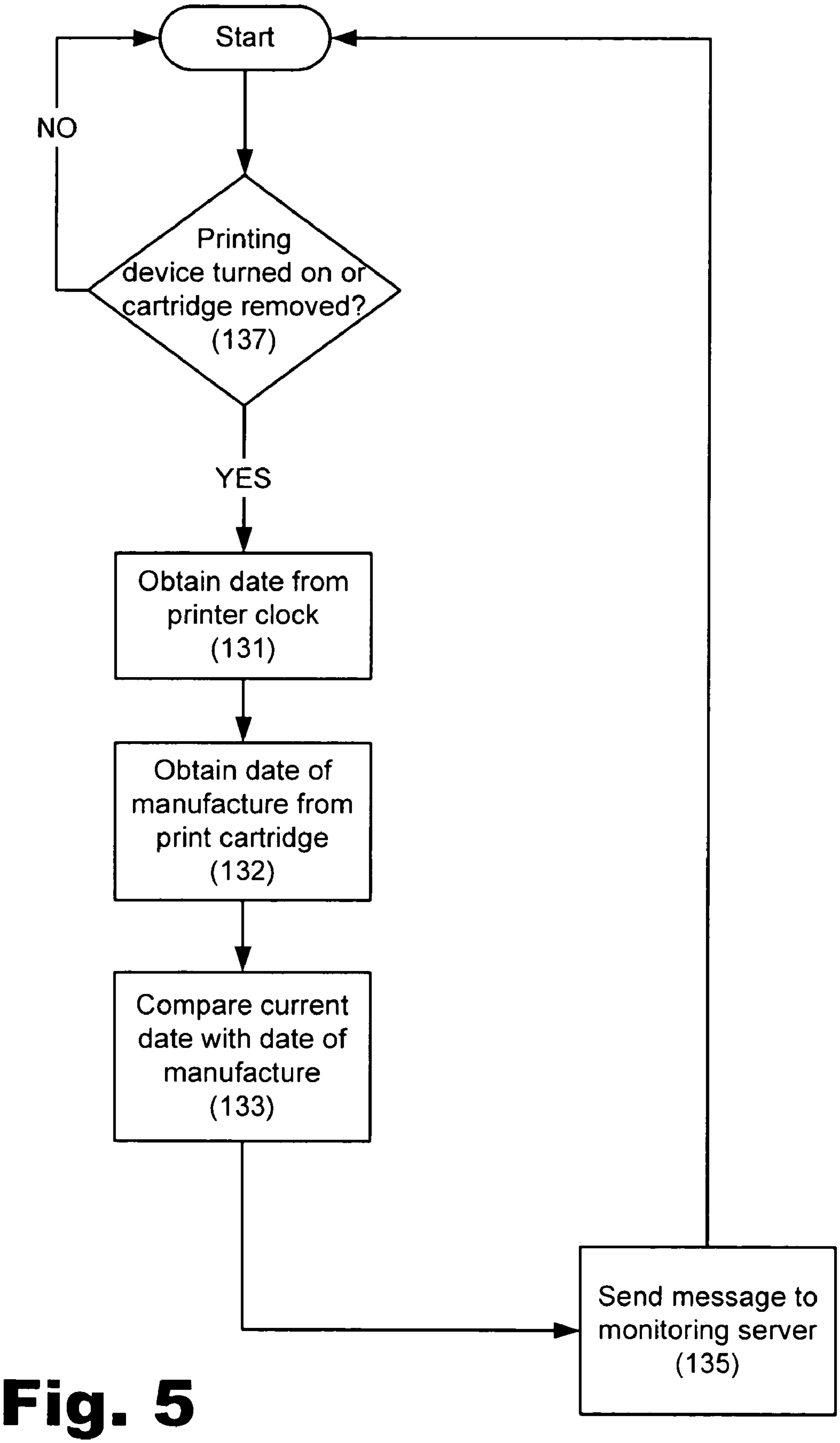
FIG. 5 is a flowchart illustrating another alternative method performed by a printing device to assist in detecting counterfeit print cartridges according to one embodiment described herein.

FIG. 5 is a flowchart illustrating another method performed by a printing device to assist in detecting counterfeit print cartridges according to one embodiment described herein. The method of FIG. 5 is similar to those described in FIGS. 3 and 4.

As shown in FIG. 5, the method may be started by either or both of the events that trigger the methods of FIGS. 3 and 4. In some embodiments, the method of FIG. 5 may be triggered if the printing device is powered up. In other embodiments, the method of FIG. 5 may be triggered if the printing cartridge is removed and a cartridge is re-installed. In some embodiments, either of these events may trigger the method of FIG. 5 (determination (137).

Once the method is triggered, the printing device obtains the date of manufacture from the print cartridge (step 132) and the current date from the printer clock (step 131). However, each time the method is triggered, the printing device sends a message to the monitoring server (step 135). This message includes the difference between the date of manufacture from the print cartridge and the current date from the printer clock. In which case, the printing device may not execute the comparison (step 133), but may leave the comparison to be made by the monitoring server. Alternatively, the printing device may make the comparison of the two dates (step 133) and message the difference between the dates to the monitoring server.

The benefit of the method of FIG. 5 is that the printing device does not need to be programmed with a predetermined threshold that governs whether a message regarding a suspect print cartridge is sent to the monitoring server. Consequently, the threshold used to indicate whether a print cartridge is suspect can be set at the monitoring server and can be adjusted as needed based on market factors such as distribution patterns, sales patterns and consumption patterns. Thus, the monitoring server determines when a print cartridge is suspect based on the raw data sent from the population of printing devices. Otherwise, the message sent to the monitoring server in the method of FIG. 5 may contain all the same information as described above, for example, the physical location of the printing device, the status of the printing device, the model and other identification of the printing device, toner usage patterns for the printing device, print cartridge history, etc.

Figure 6:
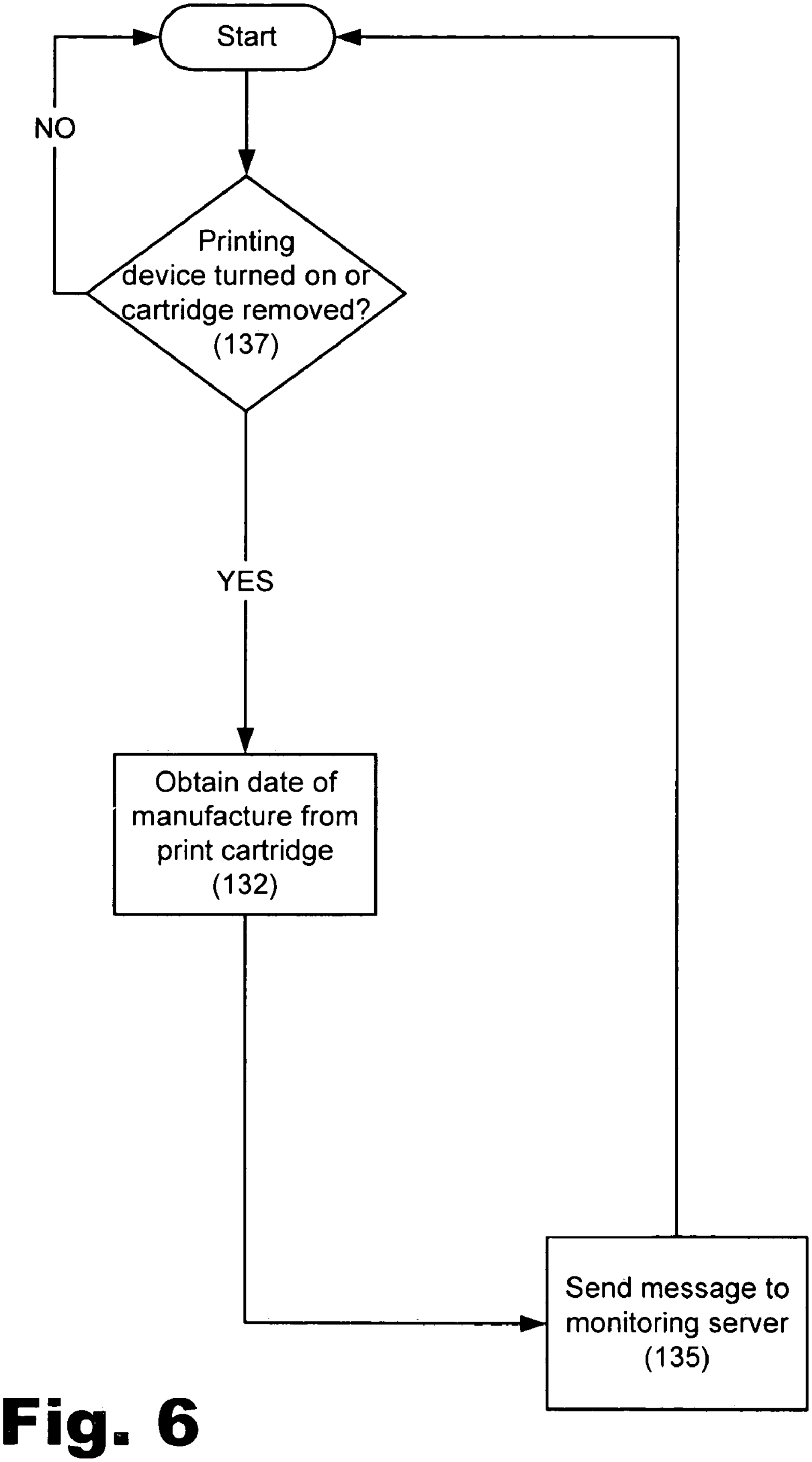
FIG. 6 is a flowchart illustrating another alternative method performed by a printing device to assist in detecting counterfeit print cartridges according to one embodiment described herein.

In another embodiment, illustrated in FIG. 6, the printing device may simply send the date of manufacture from an installed print cartridge to the monitoring server and leave it to the monitoring server to compare the date of manufacture to a current date as determined by a clock at the monitoring server. This approach has the same benefits as described above with regard to FIG. 5. Otherwise, the message sent to the monitoring server in the method of FIG. 6 may contain all the same information as described above, for example, the physical location of the printing device, the status of the printing device, the model and other identification of the printing device, toner usage patterns for the printing device, print cartridge history, etc.

Figure 7:
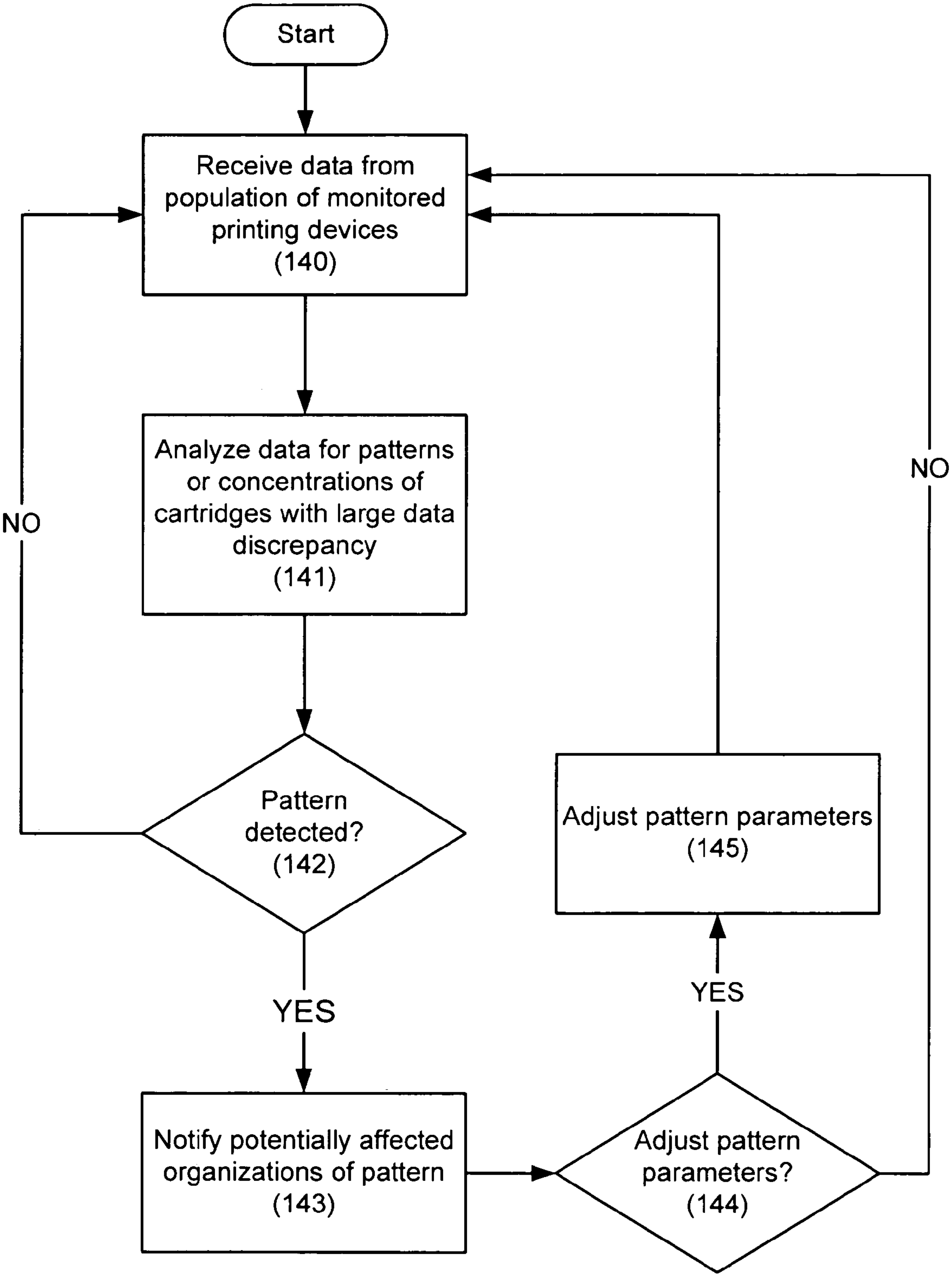
FIG. 7 is a flowchart illustrating a method of detecting a pattern of counterfeit print cartridges being used according to one embodiment described herein.

FIG. 7 is a flowchart illustrating a method of detecting a pattern of counterfeit print cartridges being used according to one embodiment described herein. The flowchart of FIG. 7 represents the operation of the monitoring program (110, FIG. 2) as executed by, for example, the monitoring server (107, FIG. 2). The monitoring program constitutes computer-readable instructions that can be executed by the monitoring server or a similar computer.

As shown in FIG. 7, the monitoring program (110) receives data from the population of monitored printing devices (step 140). There can be any number of printing devices that are operating according to the method of FIGS. 3-6 and that are sending data to the monitoring program regarding the "age" of print cartridges being used. As described above, if the reported age of the print cartridge exceeds a predetermined threshold, the cartridge becomes suspect and may potentially be counterfeit. If a number of such suspect cartridges are identified contemporaneously or in a particular geographic region, for example, the pattern may suggest the activity of a counterfeiter.

Consequently, the monitoring program analyzes the data received from the population of reporting printing devices to identify patterns that may indicate counterfeiting activity (step 141). These patterns are defined by pattern parameters that may include a predetermined threshold for the age of a print cartridge that makes the cartridge suspect, a defined geographic radius within which some number of suspect cartridges is identified, a defined time period within which some number of suspect cartridges is identified, etc.

If a pattern is detected (determination 142), notification may be sent, manually or automatically, to potentially affected organizations. For example, notification of the detected pattern of suspect cartridges may be sent to the cartridge manufacturer, the printing device manufacturer, associated service and warranty organizations, anti-counterfeiting organizations, etc. Consequently, appropriate investigation of the perceived pattern of suspect cartridges can be investigated. In this way, large-scale or pervasive counterfeiting may be detected much more rapidly than has been the case in the past.

Periodically, it may be desirable to adjust the parameters that define a pattern of potential counterfeiting (determination 144). For example, the geographic radius being monitored may change, the time period in which suspect cartridges are identified may change, or the predetermined threshold defining a print cartridge that is "too old" may be adjusted. These adjustments may be necessitated by variations in the marketing, sale and use patterns of the print cartridges. Consequently, when needed, the pattern parameters can be adjusted (step 145) at the monitoring server.

The systems and method described herein may be implemented and operated by printing device manufacturers, print cartridge manufacturers or some third party providing the service to industry members.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A system for detecting potential counterfeiting of print cartridges comprising at least one printing device programmed to:

read date information from an installed print cartridge, read a current date from a clock in said printing device, compare said date information and said current date to determine if a difference between said date information and said current date exceeds a threshold, transmit a message to a monitoring server if a difference between said current date and said date information exceeds said threshold, wherein said monitoring server is programmed to analyze said message from said printing device for patterns indicative of counterfeiting of print cartridges.

2. The system of claim 1, wherein said monitoring server is programmed to automatically transmit notification of detection of a pattern indicative of counterfeiting of print cartridges.

3. The system of claim 1, wherein:

said printing device includes a memory storing data about said printing device; and said message conveys said data about said printing device.

4. The system of claim 3, wherein said data about said printing device includes a location of said printing device.

5. The system of claim 1, wherein said printing device has a connection to the Internet over which said message is transmitted to said monitoring server.

6. The system of claim 1, wherein said monitoring server saves messages from monitored printing devices in memory.

7. The system of claim 1, wherein said printing device further comprises an electronic connection configured to be connected to an electronic memory unit on said installed print cartridge in said printing device.

8. The system of claim 1, wherein said printing device is programmed to compare said date information and said current date each time said printing device is powered up.

9. The system of claim 1, wherein said printing device is programmed to compare said date information and said current date when a print cartridge is installed in said printing device.

10. A method for detecting potential counterfeiting of print cartridges, said method comprising:

reading date information from a print cartridge in a printing device;

reading a current date from a clock;

comparing said date information and said current date to determine if a difference between said current date and said date information exceeds a predetermined threshold; and generating a message indicating a potentially counterfeit print cartridge if the difference exceeds said threshold.

11. The method of claim 10, further comprising transmitting said message regarding said date information stored on said print cartridge installed in said printing device, said message being transmitted to a monitoring server.

12. The method of claim 11, further comprising analyzing said message from said printing device with said monitoring server for patterns indicative of counterfeiting of print cartridges.

13. The method of claim 12, further comprising automatically transmitting notification of detection of a pattern indicative of counterfeiting of print cartridges.

14. The method of claim 11, wherein said message further comprises data about said printing device.

15. The method of claim 14, wherein said data about said printing device comprises a location of said printing device.

16. The method of claim 11, further comprising transmitting said message to said monitoring server from said printing device over the Internet.

17. The method of claim 11, further comprising saving messages from monitored printing devices in memory on said monitoring server.

18. The method of claim 10, further comprising reading said date information from a memory on said print cartridge.

19. The method of claim 10, further comprising comparing said date information and said current date each time said printing device is powered up.

20. The method of claim 10, further comprising comparing said date information and said current date when a print cartridge is installed in said printing device.

21. A system for detecting potential counterfeiting of print cartridges comprising:

means for transmitting a message from a printing device regarding date information stored on a print cartridge installed in a printing device; and means for receiving said message and analyzing said message and other messages to identify patterns indicative of counterfeiting of print cartridges;

said system further comprising;

means for reading a current date from a clock in said printing device, means for comparing said date information and said current date, and means for transmitting said message if a difference between said current date and said date information exceeds a predetermined threshold.

22. The system of claim 21, further comprising means for reading said date information from an electronic memory on said print cartridge.

23. The system of claim 21, further comprising means for automatically transmitting notification of detection of a pattern indicative of counterfeiting of print cartridges.

24. The system of claim 21, wherein said message further comprises data about said printing device.

25. The system of claim 24, wherein said data about said printing device comprises a location of said printing device.

26. The system of claim 21, wherein said means for transmitting said message comprise the Internet.

27. Processor-readable instructions stored on a medium for storing processor-readable instructions, said instructions, when executed, causing a processor to:

read date information from a print cartridge installed in a printing device, read a current date from a clock, compare said date information and said current date to determine if a difference between said current date and said date information exceeds a predetermined threshold indicative of expiration of an expected useful life of said print cartridge, transmit a message to a monitoring server if the difference between said current date and said date information exceeds said predetermined threshold, and wherein said monitoring server is programmed to analyze said message from said printing device for patterns indicative of counterfeiting of print cartridges.

28. The instructions of claim 27, wherein:

said printing device comprises a memory storing data about said printing device; and said message comprises said data about said printing device.

29. The instructions of claim 28, wherein said data about said printing device comprises a location of said printing device.

30. The instructions of claim 27, wherein said instructions cause said processor to compare said date information and said current date each time said printing device is powered up.

31. The instructions of claim 27, wherein said instructions cause said processor to compare said date information and said current date whenever a print cartridge is installed in said printing device.

32. The instructions of claim 27, wherein-said instructions, when executed, causing said monitoring server to:

receive said message from said printing device, wherein said message includes said date information from said print cartridge installed in said printing device, and analyze said message from said printing device for patterns indicative of counterfeiting of print cartridges.

33. The instructions of claim 32, further causing said monitoring server to automatically transmit notification of detection of a pattern indicative of counterfeiting of print cartridges.

* * * * *

UNITED STATES PATENT AND TRADEMARK OFFICE

CERTIFICATE OF CORRECTION

PATENT NO. : 7,580,144 B2
APPLICATION NO. : 10/807026
DATED : August 25, 2009
INVENTOR(S) : Don Wadley It is certified that error appears in the above-identified patent and that said Letters Patent is hereby corrected as shown below:

In column 7, line 12, in Claim 1, after "device," insert -- and --.

In column 10, line 1, in Claim 32, delete "wherein-said" and insert -- wherein said --, therefor.

Signed and Sealed this

Fourteenth Day of September, 2010

David J. Kappos
*Director of the United States Patent and Trademark Office*